Aug. 17, 1943.     D. HEYER     2,327,108
FILM HOLDER
Filed Sept. 16, 1940
Fig. 1.
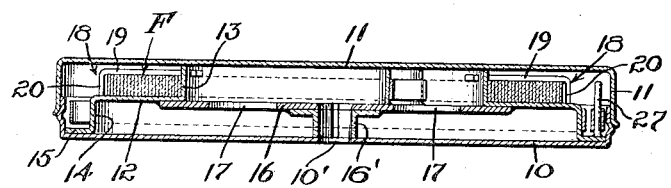
Fig. 2.
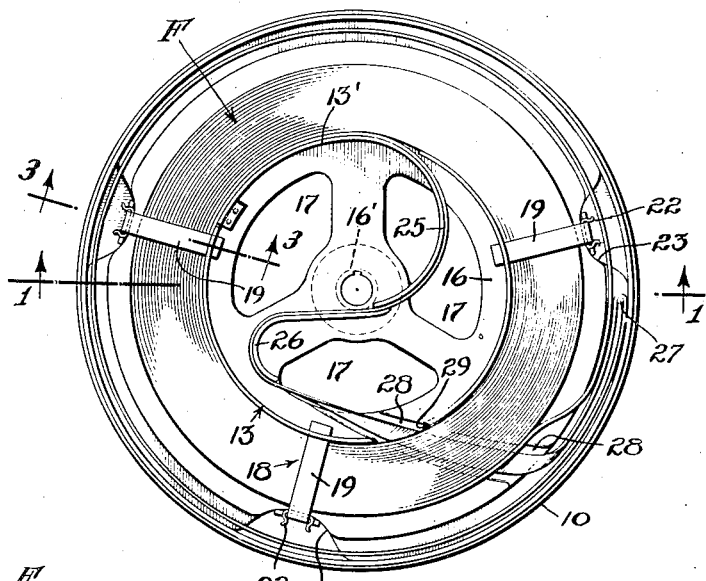
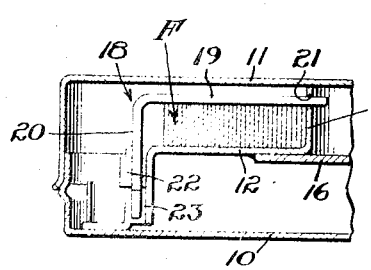
Fig. 3.
Inventor
DON HEYER,
Attorney Patented Aug. 17, 1943

2,327,108

UNITED STATES PATENT OFFICE 2,327,108

FILM HOLDER

Don Heyer, Hollywood, Calif.

Application September 16, 1940, Serial No. 356,950

9 Claims. (Cl. 88—18.7)

This invention relates to holders for endless film adapted to be used in film projectors of the type utilizing continuous film coils.

In projectors of this type the mechanism will not function correctly unless the loop of film passing from the coil through the projector is rather accurately measured during installation of the film in the magazine.

It is also essential that the film, upon installation, be in a proper condition of what may be termed looseness, that is, the ability of the individual layers of the film on the coil to slip past each other, must be preserved. It is further necessary that the film be correctly positioned over the various driving mechanisms of the magazine, and it is desirable that this correct installation be capable of accomplishments by an unskilled person.

It is, therefore, an object of the present invention to provide a film holder capable of correctly measuring the amount of film required for passage between the magazine and the projector.

It is a further object of this invention to provide a holder capable of delivering a coil of film into the magazine with the proper degree of looseness for successful operation of the machine.

It is a further object of this invention to provide a film holder having means positioning the various loops of the film in proper position on the driving mechanism of the magazine.

It is a further object of this invention to provide a holder for an endless coil of film which will prevent the film from becoming uncoiled as it is installed in the magazine of the projector.

It is a further object of this invention to provide a holder which may be used to remove film from the magazine.

It is a further object of this invention to provide a holder for an endless coil of film which will hold a coil of film during installation in the magazine, but which allows instant release when the film is properly in place.

It is a further object of this invention to provide a holder for film which may be utilized in the original making-up of the endless coil on an ordinary rewinding spindle.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing:

Figure 1 is a transverse section through a device embodying the present invention, taken as indicated by line 1—1 of Figure 2;

Figure 2 is a top plan view of the device with the cover removed; and

Figure 3 is an enlarged, fragmentary view, partly in section, taken on line 3—3 of Figure 2, but with the cover in place.

As shown in Figure 1 a container consisting of a body 10 and the cover 11 is used for enclosing the holder or reel with which this invention is particularly concerned. As will be noted, the body portion 10 has an opening 10' in the center thereof. This opening 10' is for the purpose of allowing the body 10 to be used in conjunction with the reel when the film is originally wound upon the reel in a manner which will be hereinafter described.

The holder or reel consists of the web portion 12 having a flange 13 extending from one side thereof forming a drum for the reception of a coil of film F. Another flange 14 extends from the opposite side of the web and is provided with an outstanding lip member 15. Secured to a side of web member 12 is a plate member 16 having cutout portions 17 and a hub member 16' secured to the center thereof. It will be realized from inspection of the structure thus far described that film can be wound upon the drum 13 by merely placing the body 10 of the container with its outside surface against flange 13, and mounting the whole assembly on the spindle of a rewinding device. When the reel and the body 10 of the container are so mounted, the body 10 acts as the second flange of a conventional film reel and film can be readily wound in the usual manner.

In order to secure the coil of film in place on the holder a plurality of clips 18 is provided, each clip being L-shaped and having a leg portion 19 extending across the upper edge of the coil, and another leg portion 20 extending downwardly. The inner end of the leg portion 19 of each of the clips extends into an opening 21 provided in the flange 13, and the lower end of the leg portion 20 is releasably held in a spring clip 22 secured to the flange 14. The spring clips 22 are secured to the flange 14 within instruck portions 23 thereof, these instruck portions being provided so that the clips will not project beyond the surface of flange 14.

Although the above described structure will secure the film in coil form, it is almost impossible to remove the coil of film bodily from a reel such as that so far described. At the same time it is desirable to provide means for ensuring correct positioning of the film on the film magazine. To this end, the flange 13 is not secured to the web 12 or plate 17 along its entire periphery, but has the portion 13' formed of spring material and has an ear thereon securing one end to the plate 16, thus permitting the flange to spring or bend in the portion 13'. This spring portion 13' is formed with a more or less semi-circular loop 25. This loop portion 25 extends to overlapping relation with a second stationary member 26, as clearly shown in Figure 2. This member 26 is secured to the plate 16 in any manner desired. With this construction, it is possible to accomplish two results. First, film may be readily released from the flange 13 by merely bending or springing the portion 25 forming a continuation of flange 13' in such a manner that the flange 13' bends towards the center of the reel. This loosens the coil of film sufficiently so it may be readily slipped off the flange. The second result, accomplished by the use of the flexible flange 13' and the loop guide members 25 and 26, lies in the application of film to a magazine of the type disclosed in my co-pending United States application, Serial No. 356,949, filed Sept. 16, 1940. The loop 25 is intended to guide the film so that it may pass over the driving roller which is intended to engage the inner periphery of the film in the magazine and aid in drawing the film from the coil to the projector. At the same time, the guide member 26 correctly positions the film in the magazine so that it is impossible for an unskilled person to insert the film in the magazine in any but the proper position. After the film is positioned in place with the film correctly looped about the driving rollers, the magazine is withdrawn. The film is then in correct position for being driven by the driving rollers in the machine mentioned above.

As the film intended to be held by the above described holder is continuous, that is, has its ends joined, a recess 23 is provided in the plate 16 and web member 12, as shown in Figure 2, while the flange 13 is cut out directly above the recess 23 so that film may be lead under the coil of film F to the outer periphery of the coil where it may be joined. As was mentioned above, it is important to have the proper amount of film free from the coil for threading through the projection machine. This is accomplished by utilizing flange 14 and lip 15 for the reception of a definite measured amount of film. A pin 27 is secured to the lip 15 in such a position that film passing about pin 27 can be coiled about flange 14 in a manner shown in Figure 2. As was also mentioned above, film projectors of this type will not successfully operate unless some means is provided for installing the film in the magazine under the proper conditions of looseness. This is done in the present instance by so proportioning the holder that the flange 13 forms a periphery which is slightly larger than a circle drawn tangent to the guide rollers and driving roller within the magazine. If film is wound upon the flange 13, 13' with an ordinary rewinding mechanism, it will have a certain definite tension and there will be very little opportunity for slippage between the successive layers of the film. After the film is placed in position in the magazine, while still retained on the reel, the clips 18 may be removed by sliding them out from under the coil of film. If the member 25 and flange 13' are then urged toward the center of the reel, the film will be released so that the reel may be readily removed therefrom. The film coil will then be properly disposed on the film magazine.

I claim:

1. A holder for a coil of film comprising, a web member having a flange adapted to engage the inner periphery of a coil of film, said web member having a second flange on its outer periphery, and a second web member extending from said second flange member, means holding said film in the form of a coil on the first mentioned flange member, and means holding a predetermined length of film around said second mentioned flange member, thus providing a length of film to pass through the projector.

2. A holder for a coil of film comprising, a body having a web member engageable with one edge of the coil of film and a flange member engageable with a periphery of the coil, a clip member removably secured to said body and engageable with the other edge of the coil of film, said clip being releasable from said body upon movement in a direction substantially parallel to the edges of the coil and movable in said direction sufficiently to clear the edge of the coil.

3. A holder for a coil of film comprising a body having a web member engageable with one edge of the coil of film and a flange member engageable with a periphery of the coil, said flange extending from said web member a greater distance than the width of the film coil, a clip member extending into an opening in said flange member and removable from said opening upon movement in a direction substantially parallel to the edges of the coil.

4. A holder for a coil of film adapted to permit insertion of said film into a magazine having a driving roller engaging the film comprising, a body having a web and a flange cooperatively supporting said film coil, said flange engaging the inner periphery of the coil, and a film support shaped to pass partly around said driving roller and adapted to support a loop of film and guide it into position around said roller.

5. A holder for a coil of film adapted to permit insertion of said film into a magazine having a driving roller engaging the film comprising, a body having a web and a flange cooperatively supporting said film coil, a film support shaped to pass partly around said driving roller and adapted to support a loop of film and guide it into position around said roller, said film support being resiliently mounted with respect to the rest of the body.

6. A holder for a coil of film adapted to permit insertion of said film into a magazine having a driving roller engaging the film comprising, a body having a web and a flange cooperatively supporting said film coil, said flange having a portion resiliently mounted with respect to the rest of the body and shaped to pass partly around said driving roller, a guide member secured to the body member and cooperating with said flange to form a support for a loop of film.

7. A holder for a coil of film adapted to permit insertion of said film into a magazine having a driving roller engaging the film comprising, a body having a web and a flange cooperatively supporting said film coil, said flange having a portion resiliently mounted with respect to the rest of the body and shaped to pass partly around said driving roller, a guide member secured to the body member and cooperating with said flange to form a support for a loop of film, the end of said resilient portion of said flange being adapted to grip a portion of the film loop.

8. A holder for film for inserting said film into a magazine comprising, a flange member and a web member cooperatively forming a support for film in the form of a coil, said flange member engaging the inner periphery of the coil and the web member engaging an edge of the coil, said flange member supporting said film coil for bodily removal in a direction axially of said coil, and means holding a portion of the film coiled on said holder and separate from the coil.

9. A holder for film for inserting said film into a magazine comprising, a flange member and a web member cooperatively forming a support for film in the form of a coil, said flange member engaging the inner periphery of the coil and the web member engaging an edge of the coil, said flange member supporting said film coil for bodily removal in a direction axially of said coil, and means holding a portion of the film coiled on the holder but removable without removal of the coil of film.

DON HEYER.